Patented Aug. 4, 1942

2,292,067

UNITED STATES PATENT OFFICE 2,292,067

PRODUCTION OF WHITE LEATHER

Carl H. Geister and John Thomas Chain, Wilmington, Del., and Arthur L. Fox, Woodstown, N. J., assignors to E. I. du Pont de Nemours & Company, Wilmington, Del., a corporation of Delaware No Drawing. Application April 25, 1941, Serial No. 390,368

3 Claims. (Cl. 149—5)

This invention relates to the production of improved white leather and more particularly to the manufacture of white leather by retanning chrome or formaldehyde tanned leathers with a condensation product of a diphenyl oxide sulfonic acid and formaldehyde.

This invention has an object the preparation of white leather having improved light fastness. A further object is to improve chrome or formaldehyde tanned leathers by retanning they with certain novel syntans. Other objects will appear hereinafter.

These objects are accomplished by the use of a condensation product of a diphenyl oxide sulfonic acid with formaldehyde to retan chrome or formaldehyde tanned leathers.

This invention involves the retannage of chrome tanned leathers that have been previously tanned either by the one bath or two bath method and have not been fatliquored or dried out. The invention also involves the retannage of formaldehyde tanned leathers, such as illustrated by U. S. Patent 2,004,472, before fatliquoring or drying. In the leathers to be retanned in accordance with this invention the previous chrome or formaldehyde tannages should be fully set and the pH value should be adjusted to be between 4.5 and 5.5.

Fully chrome tanned leathers have a blue coloration which must be masked to produce white leathers. White leathers have been prepared by the retannage of chrome tanned leathers with condensation products of naphthalene or cresol sulfonic acids with formaldehyde. However, the resultant leathers readily discolor when exposed to light or in storage and lack the desired roundness, fullness and temper properties.

Leathers prepared by retanning chrome tanned leather with the condensation product of diphenyl oxide monosulfonic acid with formaldehyde do not discolor after 160 hours exposure in the Fadeometer whereas similar leathers which have been retanned with the condensation products of naphthalene or cresol sulfonic acids with formaldehyde discolor within 4 to 10 hours exposure in the Fadeometer. Retannage of chrome tanned leathers with the condensation product of diphenyl oxide monosulfonic acid with formaldehyde also resulted in greatly improved tightness, roundness, fullness and other desirable leather characteristics.

The retannage of formaldehyde tanned leathers with the condensation product of diphenyl oxide monosulfonic acid with formaldehyde results in improved fastness, whiteness, roundness, tightness and uniform leather characteristics in comparison to similar leathers retanned with the condensation products of naphthalene or cresol sulfonic acids with formaldehyde.

In place of the condensation product of diphenyl ether monosulfonic acid with formaldehyde I may use the condensation product of diphenyl ether disulfonic acid with formaldehyde or the sodium salts of either of these condensation products. The preparation of these condensation products is more fully described and claimed in the copending application of Fox and Bare, Serial Number 390,330, filed on this same day, to which reference may be made.

The following examples illustrate but do not limit the invention. The amount of any agent added to the leather is expressed in terms of a percentage of the weight of the leather being treated.

*Example 1*

Fully chrome tanned skins which have not been fatliquored or dried and which have a pH value of 4 are placed in a tannery drum with one per cent of sodium borate and two hundred per cent of water. The drum is closed and rotated for thirty minutes. The drum is opened, the solution is drained off, and the skins are rinsed with water for ten minutes. The water is drained off and the drum is closed. The skins will have a pH value of approximately 5 at this point. Three per cent of the condensation product of diphenyl oxide monosulfonic acid with formaldehyde and eighty per cent of water at 120° F., on the basis of the weight of the leather in a damp condition, are added through the hollow hub or axis of the drum. The drum and contents are rotated for one hour. The drum is opened and the liquor is drained off. The skins are washed fifteen minutes in water at 80° F. The drum is closed and six per cent of titanium dioxide and one per cent of flour are added without water. The skins are drummed in the rotating drum for thirty minutes. Eighty per cent of water and from one to two per cent of sulfonated neat's foot, cod or suitably blended oils or emulsified oils are added at 120° F. and the drum is rotated for thirty minutes. The skins are removed, drained, dried and the dry finishing completed in the usual manner.

*Example 2*

Additional whiteness is obtained by treatment with five per cent of oxalic acid which is added with eighty per cent of water at 110° F. prior to the addition of the condensation product of diphenyl oxide monosulfonic acid with formaldehyde in the process described in Example 1. The skins and liquor are agitated in the rotating drum for thirty minutes. The liquor is drained off and the skins are washed twenty minutes. The drum is closed and three per cent of the condensation product of diphenyl oxide monosulfonic acid with formaldehyde and eighty per cent of water are added. The procedure from here on is described in Example 1.

*Example 3*

Additional whiteness and mellowness are obtained by the addition of five per cent of sodium thiosulfate without water to the drum after the skins have been treated with the condensation product of diphenyl oxide monosulfonic acid with formaldehyde and washed as in Example 1. The drum is rotated twenty minutes and opened. The skins are washed fifteen minutes, and the rest of the procedure, including treatments with titanium dioxide, flour and oils, is carried out as set forth in Example 1.

*Example 4*

Leather which has been partially chrome tanned with approximately one third the normal quantity of the chromium compound needed to produce a full tannage is further tanned in the preparation of a white leather. The partially tanned leather is placed in a drum with a sufficient quantity of sodium bicarbonate and water to cause it to have a pH value of from 4.5 to 5.5 after the drum has been rotated thirty minutes. The solution is drained off, and the leather is rinsed with water for ten minutes. The drum is closed and from three to six per cent, depending on the requirements of the leather, of the condensation product of diphenyl oxide monosulfonic acid with formaldehyde and eighty per cent of water at 90° F. are added. The drum is rotated for thirty minutes. The drum is opened and the leather is washed for fifteen minutes. The drum is closed and twenty per cent of aluminum sulfate and sixty per cent of water at 90° F. are added to the skins. The liquor and skins are rotated in the drum one hour. The pH value of the skins is brought to 5 to 5.5 by the addition of approximately one per cent of sodium bicarbonate. The drumming is continued until the skins have a uniform pH value throughout. The liquor is drained off. Five per cent of titanium oxide is added, and the drum is closed and rotated for thirty minutes. Eight per cent of tanner's egg yolk, two per cent of flour, four per cent of neat's foot oil and sixty per cent of water at 100° F. are added together in the form of an emulsion and the drumming continued for thirty minutes. The skins are drained and dried. The finishing is completed in the usual manner.

*Example 5*

Leather which has been previously tanned with formaldehyde and which has a pH value of from 4.5 to 5.5 is placed in a drum and rinsed. The drum is drained and closed. Retanning or additional tannage is obtained by the procedures applied to the chrome tanned leather as disclosed in the previous examples.

The quantities of materials specified in the examples are intended for the purpose of illustration. These can be varied as a means to obtain the exact degree of fullness, softness and whiteness or other properties desired.

It is not claimed that the fastness to light is improved in cases where materials which are not fast to light are used prior to, in combination with, or subsequent to the application of the condensation product of diphenyl oxide monosulfonic acid with formaldehyde in sufficient quantities to counteract the improvement obtained over that resulting from the use of a condensation product of naphthalene sulfonic acid with formaldehyde.

Resort may be had to such modifications and equivalents as fall within the spirit of the invention and the scope of the appended claims.

We claim:

1. A process of manufacturing white leather having an improved light fastness which comprises retanning chrome tanned leather with a condensation product of a diphenyl ether sulfonic acid and formaldehyde.

2. A process of manufacturing white leather having an improved light fastness which comprises retanning chrome tanned leather with the condensation product of diphenyl oxide monosulfonic acid with formaldehyde.

3. A white leather produced in accordance with the process set forth in claim 2 which does not discolor after 160 hours exposure in the fadeometer.

CARL H. GEISTER.
J. THOMAS CHAIN.
ARTHUR L. FOX.

CERTIFICATE OF CORRECTION.

Patent No. 2,292,067. August 4, 1942.

CARL H. GEISTER, ET AL.

It is hereby certified that error appears in the printed specification of the above numbered patent requiring correction as follows: Page 1, first column, line 10, for "they" read --them--; page 2, second column, line 47, claim 3, for the claim reference numeral "2" read --1--; and that the said Letters Patent should be read with this correction therein that the same may conform to the record of the case in the Patent Office.

Signed and sealed this 8th day of August, A. D. 1942.

(Seal)

Henry Van Arsdale,
Acting Commissioner of Patents.